Dec. 9, 1952 J. MORLEY 2,620,723
DOUGHNUT BAKING MACHINE
Filed Dec. 31, 1949 2 SHEETS—SHEET 1
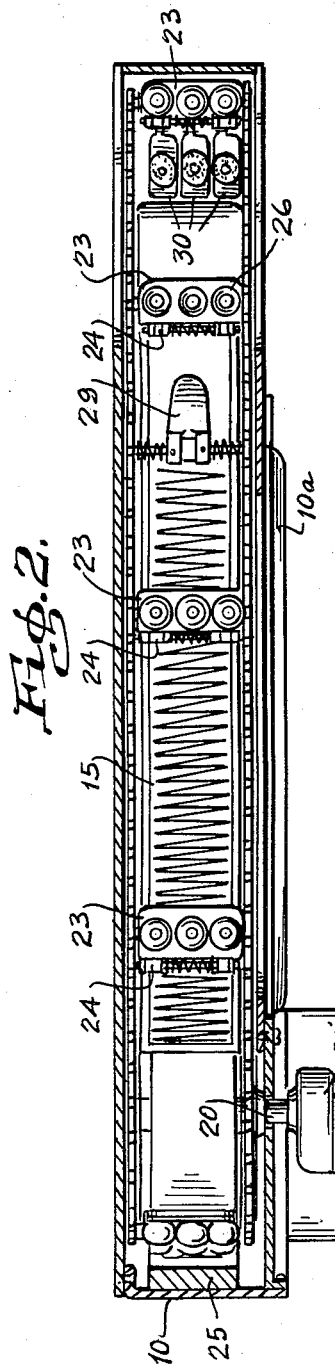
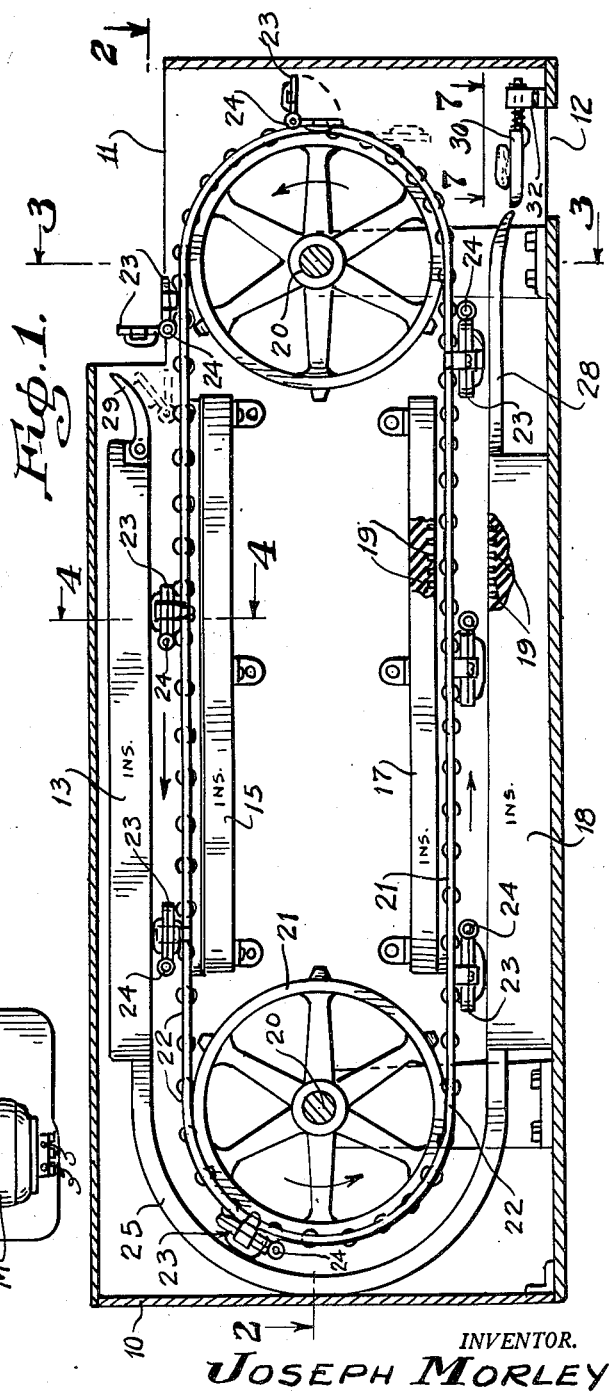
INVENTOR.
JOSEPH MORLEY
BY
ATTORNEY.

Dec. 9, 1952 J. MORLEY 2,620,723
DOUGHNUT BAKING MACHINE
Filed Dec. 31, 1949 2 SHEETS—SHEET 2
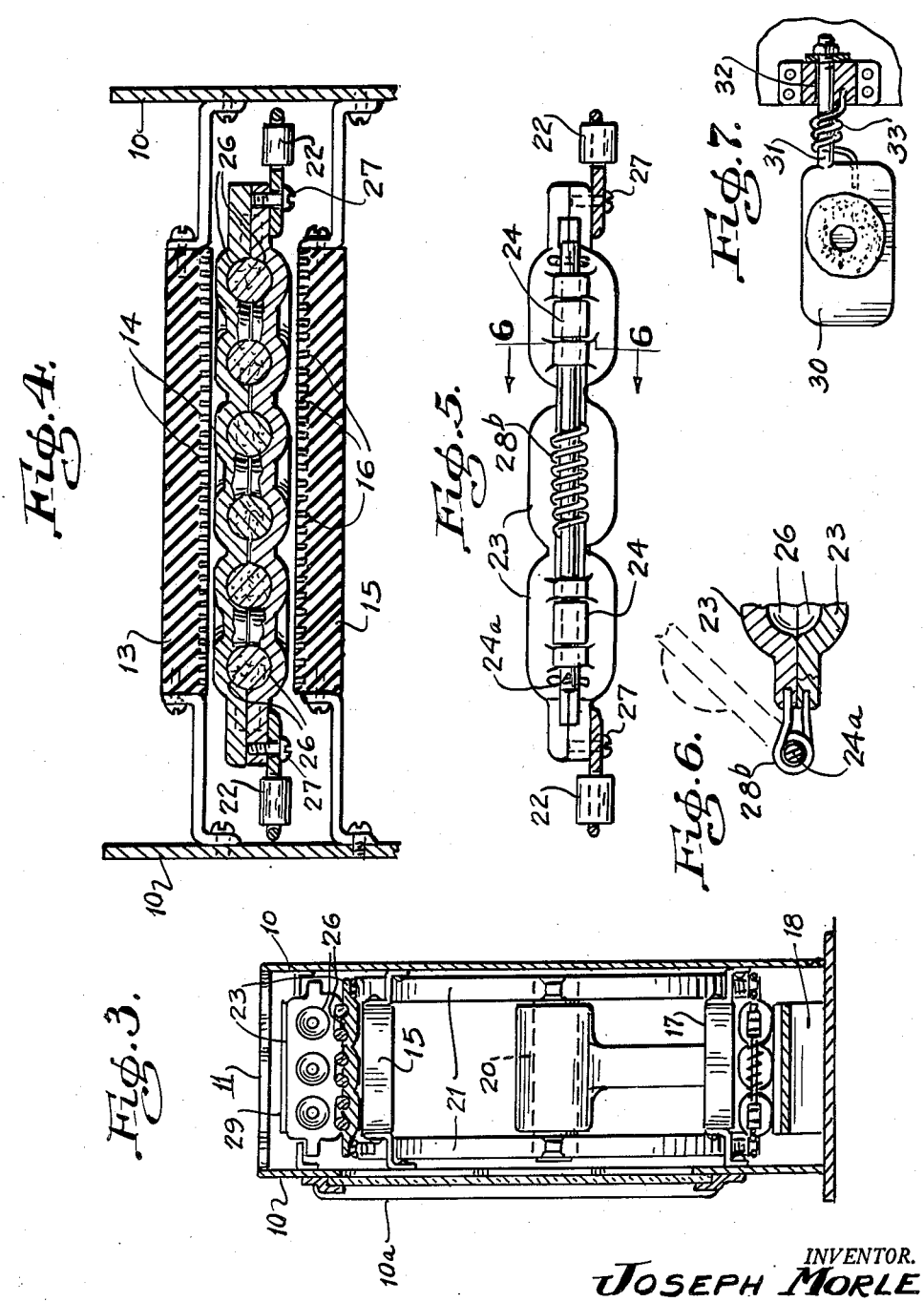
INVENTOR.
JOSEPH MORLEY
BY
Martin P. Smith
ATTORNEY.

Patented Dec. 9, 1952

2,620,723

UNITED STATES PATENT OFFICE 2,620,723

DOUGHNUT BAKING MACHINE

Joseph Morley, Los Angeles, Calif., assignor to Mabel Francis Morley

Application December 31, 1949, Serial No. 136,291

1 Claim. (Cl. 99—373)

My invention relates to a mechanical oven or machine for baking doughnuts and the like and has for its principal objects, to generally improve upon and simplify the construction of the existing forms of doughnut baking machines, to provide a machine wherein the baking pans are mounted on an endless carrier so as to travel first in one direction, and then in the other past heating means, preferably electric heating elements, so as to accomplish uniform baking of the doughnuts or other food products; further to provide for the closing of the baking pans after they have been filled with the product forming batter or dough and as they enter the baking chamber and further, to construct the baking pans so that they automatically open and permit the baked products to discharge at the end of their travel through the baking chamber.

With the foregoing and other objects in view, my invention consists in certain novel features of construction and arrangement of parts which will be hereinafter more fully described and claimed and illustrated in the accompanying drawings, in which:

Fig. 1 is a vertical longitudinal section taken lengthwise through the machine and showing the endless carrier, the baking pans and the heating means in elevation.

Fig. 2 is a horizontal section taken approximately on the plane indicated by dotted line 2—2 of Fig. 1.

Fig. 3 is a cross section taken on the line 3—3 of Fig. 1.

Fig. 4 is an enlarged cross section taken on the line 4—4 of Fig. 1.

Fig. 5 is a rear elevational view of one of the baking pans and showing its connections with links in the chains of the endless conveyor.

Fig. 6 is a detail section taken on the line 6—6 of Fig. 5.

Fig. 7 is a fragmentary plan view taken looking in the direction indicated by arrows 7—7, Fig. 1.

Referring by numerals to the accompanying drawings which illustrate a preferred embodiment of my invention, 10 designates a substantially rectangular housing, preferably sheet metal having in its top at one end an opening 11 to permit filling the baking pans; and in the bottom of the housing, below opening 11, is an opening 12, through which the baked products discharge. One or both of the side walls of housing 10 may be provided with a glazed door or window 10a, thus enabling attendants to observe the action of the endless conveyor and heating elements during the baking function.

Suitably supported in the upper portion of housing 10 is a plate 13, of asbestos insulation, in the under face of which is imbedded an electric heating element 14, preferably a wire or ribbon of Nichrome. Supported a short distance below plate 13, is a similar asbestos insulation plate 15, in the upper face of which is embedded a heating element 16, preferably a Nichrome wire or ribbon. Suitably supported in the lower portion of the housing, below plates 13 and 15, are spaced upper and lower plates 17 and 18 respectively, with heating elements 19, preferably Nichrome wire or ribbon in the under face of the upper plate and the upper face of the lower plate.

Journaled in the side walls of housing 10 adjacent its ends are shafts 20, each carrying near the side walls of the housing, sprocket wheels 21, connected by longitudinally disposed sprocket chains 22. These chains pass between the pairs of places 13 and 15, and 17 and 18, thus providing an endless carrier for the baking pans.

At the end of the machine opposite from the opening 11, the shaft 20 is connected through suitable reduction gearing within a housing 23, to the shaft of an electric motor M. At the closed end of the machine housing, a semi-circular track rail 25 concentric with the adjacent shaft 20, connects the corresponding end of plates 13 and 18, thus forming a bearing for the baking pans as they pass from the upper to the lower flight portions of the chains 22.

Baking pans or molds are carried at suitably spaced intervals by chains 22, each pan comprising a pair of practically identical plates or blocks of metal 23, connected on one side by hinges 24, including hinge pins 24a.

The contacting faces of plates 23 are provided with coinciding recesses 26 which receive the dough or batter to be baked into doughnuts or the like and the inner one of each pair of plates has its ends secured to links of the chains 22 by screws or bolts 27.

Mounted on each hinge pin 24a between the hinges 24 is a torsional spring 28b, the ends of which are connected respectively to the edges of the adjacent plates 23 and said springs act to open the baking pans by swinging the outer members of said pans away from the inner members as the pans reach that portion of the endless conveyor beneath the open end of housing 10.

A supporting plate 28 projects from the end of plate 18 to maintain the outer members of the baking pans in closed positions until they start upward on the conveyor below opening 11 in housing 10.

Projecting from the end of plate 13, adjacent opening 11 in the housing, is a guide plate 29 which engages the outer members of the baking pans and swings same downwardly onto the inner members, thus closing the baking pans as they are carried by the conveyor into and through the space between plates 13 and 15 and the heating elements seated therein.

While the pans are open and traveling below opening 11 in the housing, the cavities 26 are filled with dough or batter, either manually or by mechanical means (not shown).

For receiving and delivering the doughnuts into a receptacle located below outlet opening 12 as they discharge from the baking pans, which open after passing the end of plate 28, a series of plates 30 are disposed above outlet opening 12, each plate being provided with a shaft 31 located to one side of the longitudinal center of the plate. And all shafts are journalled in bearings such as 32 on the bottom of the housing.

On each shaft 31 is a torsional coil spring 33, the ends of which are seated respectively in the corresponding plate and shaft bearing. Normally, each spring maintains its associated plate in a horizontal position, as seen in Fig. 7.

In operation, motor 24, through the reduction gear in housing 23 drives the endless conveyor at a predetermined speed, with upper flight moving in one direction between the heating element carrying plates 13 and 15 and then in the opposite direction between the heating element carrying plates 17 and 18.

The depressions in the inner plate of each pair forming the baking pans is filled with dough or batter as the open pan travels to the tops of the wheels 21, below opening 11, and as the outer plates of the pans contact guide plate 29 they will be swung downward onto the inner plates, thereby closing the pans and in such condition they will pass between the heating elements in plates 13 and 15 so as to be heated and thereby partially accomplish the baking function.

After passing around the wheels 20 in the closed end of housing 10, the baking pans pass between plates 17 and 18 and their heating elements, thus completing the baking function.

During their entire travel between plates 13 and 15 and 17 and 18, also against semi-circular rail 25, the outer hinged members of the baking pans are maintained in closed positions against the inner members, which are connected to the sprocket chains and in moving upward after leaving plate 28, the outer members of the pans swing away from the inner members and thereby permit the baked products to discharge and drop onto the tilting plates 30 and from thence, into a suitable receptacle located below opening 12.

Thus it will be seen that I have provided a doughnut baking machine which is simple in structure, practically automatic in operation and which is very effective in performing the functions for which it is intended.

Minor changes in the size, form and construction of the various parts of my improved doughnut baking machine may be made and substituted for those herein shown and described without departing from the spirit of my invention, the scope of which is set forth in the appended claim.

I claim:

In a doughnut baking machine, a housing, an endless conveyor arranged for operation within said housing, said conveyor including pairs of sprocket wheels, sprocket chains carried by said wheels, heating elements disposed above and below both upper and lower flights of said chains, baking pans carried by said chains, each pan comprising a pair of plates hinged to each other, a spring associated with each hinge for normally exerting pressure tending to swing one plate away from the other, a plate secured to the upper one of said heating elements for automatically closing said baking pans as they enter the upper pair of heating elements, a plate arranged beneath the discharge end of said conveyor for holding said baking pans closed until they start upward at the open end of said housing, and a series of horizontally disposed independently operable plates arranged beneath the discharge end of the conveyor for receiving the baked products from the pans in said conveyor, as said pans open below the end of said last mentioned plate.

JOSEPH MORLEY.

REFERENCES CITED

The following references are of record in the file of this patent:

UNITED STATES PATENTS

| Number | Name | Date |
|---|---|---|
| 1,401,945 | Morris | Dec. 27, 1921 |
| 1,443,242 | Roth | Jan. 23, 1923 |
| 1,926,313 | Smith | Sept. 12, 1933 |
| 2,207,264 | Neuberger | July 9, 1940 |
| 2,349,583 | Tatosian | May 25, 1944 |